US012188297B2

(12) United States Patent
DeMello et al.

(10) Patent No.: US 12,188,297 B2
(45) Date of Patent: Jan. 7, 2025

(54) METHOD FOR MANUFACTURING A MICRO-CELLULAR FOAM WEATHER SEAL

(71) Applicant: ULTRAFAB, INC., Farmington, NY (US)

(72) Inventors: Alan J. DeMello, Newmarket, NH (US); Kyle Hayward, Hilton, NY (US); Daniel Babin, Billerica, MA (US)

(73) Assignee: ULTRAFAB, INC., Farmington, NY (US)

( * ) Notice: Subject to any disclaimer, the term of this patent is extended or adjusted under 35 U.S.C. 154(b) by 196 days.

(21) Appl. No.: 17/899,261

(22) Filed: Aug. 30, 2022

(65) Prior Publication Data
US 2023/0160254 A1 May 25, 2023

Related U.S. Application Data

(62) Division of application No. 16/570,815, filed on Sep. 13, 2019, now abandoned.

(51) Int. Cl.
*B29C 44/24* (2006.01)
*B29C 44/22* (2006.01)
(Continued)

(52) U.S. Cl.
CPC ............ *E06B 7/2314* (2013.01); *B29C 44/22* (2013.01); *B29C 44/50* (2013.01);
(Continued)

(58) Field of Classification Search
CPC ..... B29C 44/22; B29C 44/24; B29C 44/5627; B29C 44/5681; B29C 44/60;
(Continued)

(56) References Cited

U.S. PATENT DOCUMENTS 3,699,197 A * 10/1972 Egger ..................... B29C 48/92
264/40.7 X
3,903,224 A * 9/1975 Billiu ..................... B29C 44/42
264/DIG. 83
(Continued)

FOREIGN PATENT DOCUMENTS

DE 3511840 A * 10/1986 ........... G01B 13/028
JP S57162213 A 10/1982
(Continued)

OTHER PUBLICATIONS

Translation of DE 3511840 A (published on Oct. 9, 1986).*
(Continued)

*Primary Examiner* — Leo B Tentoni
(74) *Attorney, Agent, or Firm* — BOND, SCHOENECK & KING, PLLC; George R. McGuire

(57) ABSTRACT

A weather seal includes an elongated micro-cellular foam bulb, and an elongated micro-cellular foam fin element attached to an extending along the length of the foam bulb. The fin elements includes a spine having opposed planar surfaces and at least one microcellular foam barb extending outwardly and at a downward angle from each surface and along the length of the spine. As an alternative to barbs, another option is to use a higher durometer foamed thermoplastic elastomer in a hollow circle shape that would push into a retention pocket. A t-slot version that has a foamed bulb and a polypropylene base is another option.

6 Claims, 11 Drawing Sheets

(51) Int. Cl.
| | |
|---|---|
| *B29C 44/50* | (2006.01) |
| *B29C 44/56* | (2006.01) |
| *B29C 44/60* | (2006.01) |
| *B29C 48/00* | (2019.01) |
| *B29C 48/12* | (2019.01) |
| *B29C 48/16* | (2019.01) |
| *B29C 48/49* | (2019.01) |
| *B29C 48/90* | (2019.01) |
| *B29C 48/92* | (2019.01) |
| *E06B 7/23* | (2006.01) |
| *F26B 5/00* | (2006.01) |
| *G01G 9/00* | (2006.01) |
| *G01G 19/22* | (2006.01) |
| *B29D 99/00* | (2010.01) |
| *B29K 21/00* | (2006.01) |
| *B29K 23/00* | (2006.01) |
| *B29K 105/04* | (2006.01) |
| *B29L 31/26* | (2006.01) |

(52) U.S. Cl.
CPC ...... *B29C 44/5627* (2013.01); *B29C 44/5681* (2013.01); *B29C 44/605* (2013.01); *B29C 48/0012* (2019.02); *B29C 48/12* (2019.02); *B29C 48/49* (2019.02); *B29C 48/905* (2019.02); *E06B 7/2312* (2013.01); *B29C 2948/92* (2019.02); *B29C 2948/92428* (2019.02); *B29C 2948/9258* (2019.02); *B29C 2948/926* (2019.02); *B29C 2948/92923* (2019.02); *B29D 99/0053* (2013.01); *B29K 2021/003* (2013.01); *B29K 2023/12* (2013.01); *B29K 2105/04* (2013.01); *B29L 2031/26* (2013.01); *B29L 2031/265* (2013.01)

(58) Field of Classification Search
CPC ... B29C 44/605; B29C 48/0012; B29C 48/12; B29C 48/16; B29C 48/49; B29C 48/905; B29C 48/92; B29C 2948/92; B29C 2948/92428; B29C 2948/9258; B29C 2948/926; B29C 2948/92923; B29D 99/0053; B29K 2021/003; B29K 2023/12; B29K 2105/04; B29L 2031/26; B29L 2031/265; F26B 5/00; G01G 9/00; G01G 19/22
USPC ............ 264/40.1, 40.7, 45.9, 46.1, 51, 167, 264/173.17, 173.19, 177.1, 177.17, 178 R, 264/209.3, 210.2, 211.12, 211.13, 406, 264/408, 409, 410, 412; 34/459; 177/1
See application file for complete search history.

(56) References Cited

U.S. PATENT DOCUMENTS

| | | | | |
|---|---|---|---|---|
| 2001/0031351 | A1* | 10/2001 | Rood | B60J 10/00 264/45.9 X |
| 2013/0055644 | A1* | 3/2013 | Baratin | B60J 10/18 264/177.1 X |

FOREIGN PATENT DOCUMENTS

| | | | | | |
|---|---|---|---|---|---|
| JP | H0985212 | A | | 3/1997 | |
| JP | 09243333 | A | * | 9/1997 | ............ B29C 48/92 |
| JP | H10244578 | A | | 9/1998 | |
| JP | 2000102960 | A | | 4/2000 | |
| JP | 2001121973 | A | * | 5/2001 | ............ B60J 10/08 |
| JP | 2010167795 | A | | 8/2010 | |
| JP | 2011225688 | A | | 11/2011 | |
| JP | 2015085774 | A | | 5/2015 | |
| KR | 20040005028 | A | * | 1/2004 | ........... B29C 48/154 |

OTHER PUBLICATIONS

Translation of JP 09243333 A (published on Sep. 19, 1997).*
Translation of JP 2001121973 A (published on May 8, 2001).*
Translation of KR 20040005028 A (published on Jan. 16, 2004).*
Translated Japanese Office Action, Application No. 2022-514604, dated Jul. 30, 2024, entire document.

* cited by examiner

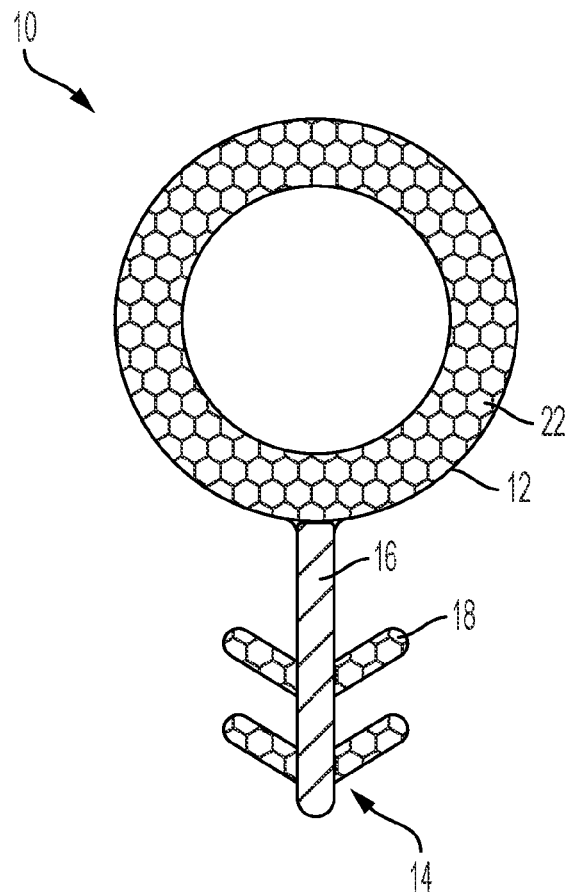
 PP: fractional melt, high impact copolymer
 Foam: 25A durometer TPV with chemical foaming agent
FIG. 3

ECD Set Up Form

| | | | |
|---|---|---|---|
| Part #: | | Bin 1 Material Hose | Silver |
| Drawing #: | | Bin 1 Material | TPE |
| Die Tooling | | Bin 2 Loader | 4 |
| | | Bin 2 Material Hose | Blue |
| Plate 1: | ADFAC0022 | Bin 2 Material | N/A |
| Plate 2: | ADFAC0020 | Bin 3 Material | CFA |
| Plate 3: | ADFAC0021 | Bin 4 Material | ECBLACKCOLORUCX-W |
| Plate 4: | N/A | Dryer | |
| Main extruder | | Machine | 3537 |
| Machine | 3645 | Material | 3607 |
| Screw Type | standard screw | Temp (°F) | 180 |
| Screw Size (inches) | 2 | Time (min) | 20 |
| Screen Pack | standard stack | Main-Gravimetric Auger Feeder | |
| Adapter tooling | ADFA000017 | Machine | 3803 |
| Mount tooling | N/A | Material | ECBLACKCOLORUCX-W |
| Barrel/Zone 1 (°F) | 340 | LBS/HR | 36 |
| Barrel/Zone 2 (°F) | 365 | % LDR | 0 |
| Barrel/Zone 3 (°F) | 375 | MicroAir | |
| Barrel/Zone 4 (°F) | N/A | Machine | 3552 |
| Die 1 (°F) | 365 | Pressure (in. of water) | N/A |
| Die 2 (°F) | 385 | Date: | |
| Die 3 (°F) | 385 | Time: | |
| Die 4 (°F) | N/A | Shift: | |
| Melt Temp. (°F) | 384 | Operator: | |
| Dial | N/A | Line: | |
| Speed (RPM) | 58 | Reason: R&D Sample Production | |
| Pressure (psi) | 520 | Co-extruder | |
| MAX Pressure (psi) | 6000 | Machine | 3485 |
| Loader | 1 | Screw Type | standard screw |
| Material Hose | red | Screw Size (inches) | 1.25 |
| Material | 3537 | Screen Pack | standard stack |
| Blender | | Adapter tooling | ADFA00004 |
| Machine | 3607 | Mount tooling | N/A |
| Recipe | 7 | Barrel/Zone 1 (°F) | 400 |
| Bin 1 Loader | 3 | | |

FIG. 5A

ECD Set Up Form

| | | | |
|---|---|---|---|
| Barrel/Zone 2 (°F) | 390 | Tank Tooling 1 | N/A |
| Barrel/Zone 3 (°F) | 380 | Tank Tooling 2 | N/A |
| Barrel/Zone 4 (°F) | N/A | Tank Tooling 3 | N/A |
| Die 1 (°F) | 440 | Tank Tooling 4 | N/A |
| Die 2 (°F) | 450 | Tank Tooling 5 | N/A |
| Die 3 (°F) | N/A | Tank Tooling 6 | N/A |
| Die 4 (°F) | N/A | Tank Tooling 7 | N/A |
| Melt Temp. (°F) | 420-460 | TT 1 location | 4 |
| Dial | 900 | TT 2 location | 9 |
| Speed (RPM) | 43 | TT 3 location | 13 |
| Pressure (psi) | 600 | TT 4 location | N/A |
| MAX Pressure (psi) | 6000 | TT 5 location | N/A |
| Loader | 2 | TT 6 location | N/A |
| Material Hose | green | TT 7 location | N/A |
| Material | Polypropylene | Die air pressure (psi) | 5 |
| Co-Gravimetric Auger Feeder | | Chiller | |
| Machine | 3804 | Machine | 3470 |
| Material | ECUVSTABILIZER | Temperature (°F) | 50 |
| LBS/HR | 12 | Puller #1 | |
| % LDR | 2 | Machine | 3550 |
| Coolant Tank | | Speed (dial) | N/A |
| Machine | 3327 | Speed (ft/min) | 39.5 |
| Distance to die (in.) | 6 | Cut Length | N/A |
| Water height (in.) | 5 5/8 | Cut Time | N/A |
| Temperature 1 (°F) | 50 | Winder | |
| Temperature 2 (°F) | 50 | Machine | 2044 |
| Temperature 3 (°F) | 50 | Wand head size (in.) | |
| Water Sprayer 1 | 40 | Traverse pitch | 552 |
| Water Sprayer 2 | 40 | Speed | 80 |
| Water Sprayer 3 | 40 | Mode | STC |
| Water Sprayer 4 | 40 | Winder Weight (lbs.) | 2.5 |
| Tank Tooling 0 | N/A | | |

FIG. 5B

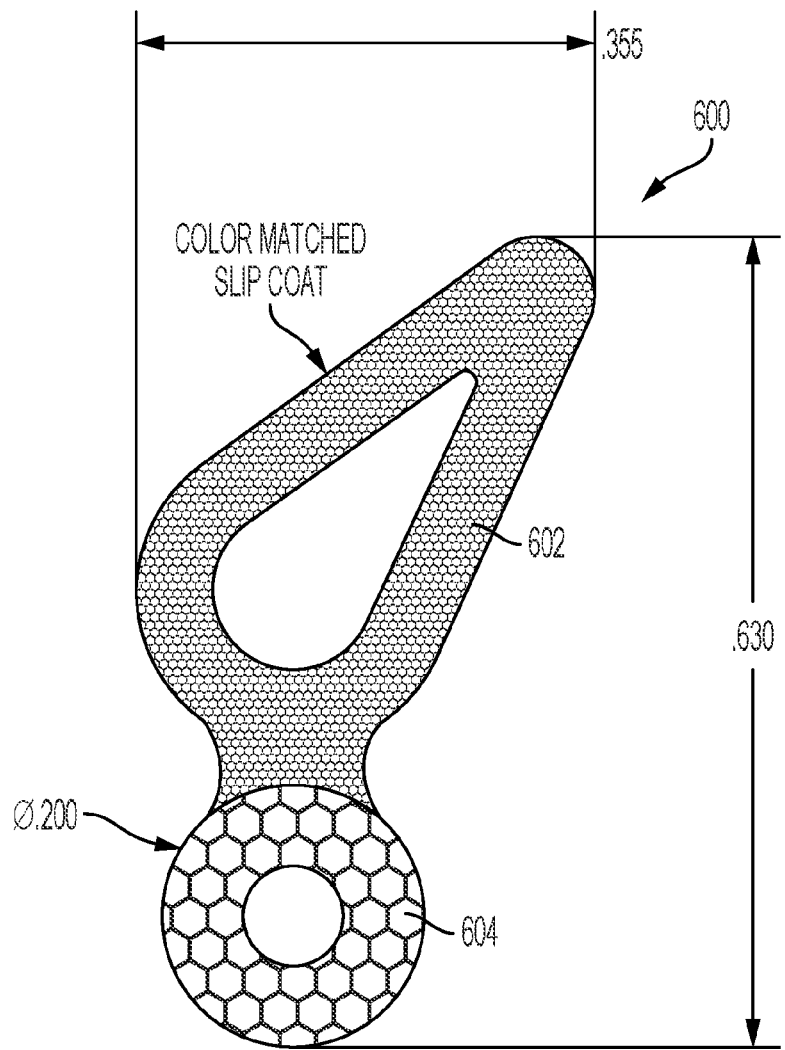
 - TPE - 25 DUROMETER, UV RESISTANT, SHORE A
 - TPE - 30 DUROMETER, UV RESISTANT, SHORE A
FIG. 10

METHOD FOR MANUFACTURING A MICRO-CELLULAR FOAM WEATHER SEAL

CROSS-REFERENCE TO RELATED APPLICATION

The present application relates and is a divisional application of applicant's co-pending U.S. application Ser. No. 16/570,815, filed Sep. 13, 2019, the entirety of which is hereby incorporated by reference.

GOVERNMENT FUNDING

N/A

FIELD OF THE INVENTION

The present disclosure is directed generally to weather seals used on windows and doors and methods for manufacturing the same.

BACKGROUND

Weather seals or weather-strips are commonly attached to the edges of doors and windows to decrease or prevent air from permeating between the interior and exterior of the door or window. Weather seals are also used to seal between the moving components of a window and door. Most typically weather seals are composed of thermoplastic elastomers or EPDM rubber, wrapped urethane foam or other flexible thermoset materials. These materials provide flexibility, resiliency, durability, and generally have low coefficients of friction and provide a consistent low closing force. Minimizing the loss of functional height of the weather seal over the life of the window or door is very important.

More advanced weather seals feature multiple bulbs and sealing flaps that extend the reach of a bulb seal. Some advanced or higher performance weatherseals have a solid foam center made from urethane foam or a TPE water blown foam. In some cases a hollow foam may be used to reduce closing forces. The materials and processing methods used to make foam filled seals are complex, expensive and require multiple steps. Urethane seals are not recyclable and utilize a two-part chemistry process that requires special handling methods. The two advanced weathers seals described above will use at least three different materials requiring three extruders and if they add a slip coating to reduce friction, a fourth extruder is required. This results in an expensive process that takes up a considerable amount of space. These processes also require highly skilled workers due to the complexity of the processes used.

Accordingly, there is a need in the art for a more cost-effective solution that produces a resilient foamed bulb seal with insertion barbs that is recyclable and has a low closing force and a very low loss of functional height over time. This cost effective and environmental friendly solution would use two, or at most three conventional extruders in a single step process if a slip coating is required.

SUMMARY

The present disclosure is directed to a micro-cellular foam weather seal and the method for manufacturing the seal.

According to an aspect is a weather seal for use on a weather permeable barrier separating the indoor from the outdoor, comprising: an elongated, compressible micro-cellular foam bulb adapted for connection to the barrier; and an elongated, compressible micro-cellular foam element attached to and extending along the length of the foam bulb, wherein the foam element is spaced from the barrier.

According to an embodiment, the weather seal further comprises a silicone slip agent incorporated therein.

According to an embodiment, the weather seal further comprises a polypropylene member attached to and extending the length of the foam bulb and to which the foam element is attached.

According to an embodiment, the polypropylene member comprises an elongated spine having opposing surfaces and the foam element comprises at least one barb extending off of each surface of the spine.

According to an embodiment, the weather seal further comprises at least one sealing flap that extends diagonally upward from the top of bulb, opposite the spine.

According to an embodiment, the foam bulb is of a first predetermined diameter and the foam element comprises a bulb-shape and is of a second diameter smaller than the first diameter.

According to an embodiment, the foam bulb is tear-drop shaped and or a predetermined length and the foam element is of a bulb-shape having a diameter that is smaller in dimension than the predetermined length.

According to an embodiment, the bulb has hardness in the range of 10 to 75 durometer on a shore A scale and the foam element has a hardness in the range of 10 to 75 durometer on a shore A scale.

According to an aspect is a method for manufacturing a multi-cellular foam weather seal for use on a weather permeable barrier separating the indoor from the outdoor and having an elongated, compressible micro-cellular foam bulb adapted for connection to the barrier and an elongated, compressible micro-cellular foam element attached to and extending along the length of the foam bulb, wherein the foam element is spaced from the barrier, the method comprising the steps of: delivering the multi-cellular foam material from a storage cell to a weigh scale blender and then to a drier; delivering the multi-cellular foam material from the drier to a main extruder; delivering a polypropylene material from a storage cell to a first co-extruder; pulling the multi-cellular foam material and the polypropylene material from through the main extruder and first co-extruder, respectively, and into a die; forming the weather seal in the die; pulling the weather seal from the die and into a sizer plate; pulling the weather seal from the sizer plate into a cooling tank; blowing off excess water from the weather seal after it passes out of the cooling tank; and winding the weather seal on a reel.

According to an embodiment, the method further comprises the step of providing a second co-extruder and delivering a slip agent material into the second co-extruder.

According to an embodiment, the method further comprises the step of injecting the slip agent material from the second c-extruder into the die, whereby the slip agent material will coat the weather strip as it comes out of the die.

According to an embodiment, the method further comprises the step of optically inspecting the weather strip as it comes out of the cooling tank.

According to an embodiment, the method further comprises the step of maintaining the water in the cooling tank at a predetermined temperature.

According to an aspect is a method for manufacturing a multi-cellular foam weather seal for use on a weather permeable barrier separating the indoor from the outdoor and having an elongated, compressible micro-cellular foam bulb adapted for connection to the barrier and an elongated, compressible micro-cellular foam element attached to and extending along the length of the foam bulb, wherein the foam element is spaced from the barrier, the method comprising the steps of: preparing a set-up sheet configured with the die tooling parameters, main extruder heat settings, and material recipe; verifying the correct die assembly is in place; verifying the correct material recipe is being used; verify the extruder heat settings are correct; stringing up a weather strip by pulling one through an assembly line to a puller; providing a micro-cellular foaming agent procedure to be followed during manufacture of the weather seal; stabilizing the pressure in the extruders for a predetermined period of time; inspecting the weather strip for quality as it comes off the manufacturing line; and if the weather seal does not pass the quality inspection, adjusting the speed with which the weather strip is pulled through the manufacturing line.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 3 is a cross-sectional view of a weather seal taken along line 3-3 of FIG. 1, in accordance with an embodiment.

FIGS. 5A and 5B_is an exemplar set up sheet split into two halves for purposes of convenience, in accordance with an embodiment.

FIG. 10 is a cross-sectional view of a weather seal, in accordance with an embodiment.

DETAILED DESCRIPTION OF EMBODIMENTS

The present disclosure describes a micro-cellular thermoplastic elastomer foam weather seal. The material used for the weather seal may be any of: TPE—Thermoplastic Elastomers, TPV—Thermoplastic Vulcanizates, or TPO—Thermo plastic Olefins.

Figure 1:
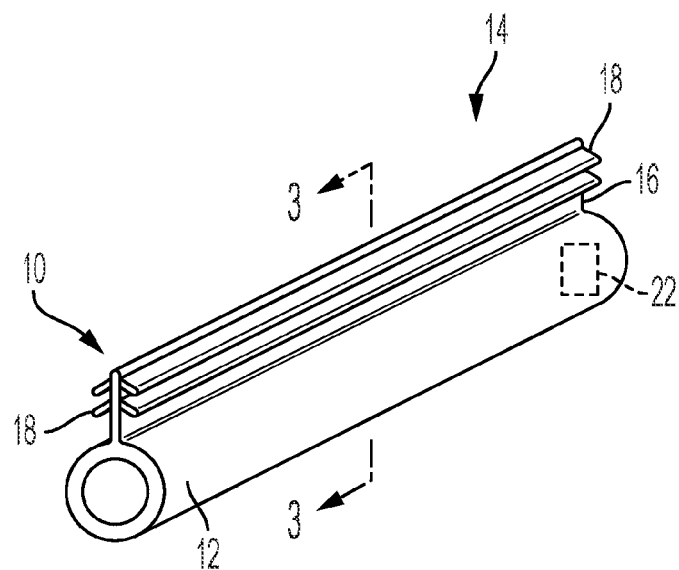
FIG. 1 is a perspective view of a weather seal, in accordance with an embodiment.

Referring to FIG. 1, in one embodiment, is a micro-cellular foam weather seal 10, generally comprising an elongated, bulb-like body 12, and an elongated barb element 14 that extends along the length of body 12. Fin element 14 comprises a fin/spine 16 that has opposing, planar surfaces, and a series of barbs 18 that extend outwardly and at an angle towards the body 12 from each planar surface of fin/spine 16. Barbs 18 are shorter in width than the height of fin/spine 16 and are positioned in parallel, laterally spaced relation to one another along the height of the fin/spine 16.

Barbs 18 and body 12 are composed of a thermoplastic elastomer with a chemical foaming agent (to produce a microcellular foam), while fin/spine 16 is composed of polypropylene. The thermoplastic elastomer has a Shore A hardness of 10 durometer to 75 durometer, and more preferably, 25 to 65 and the chemical foaming agent reduces the density by 10%-40%. Body 12 has a preferable thickness of 0.020" to 0.200".

Figure 2:
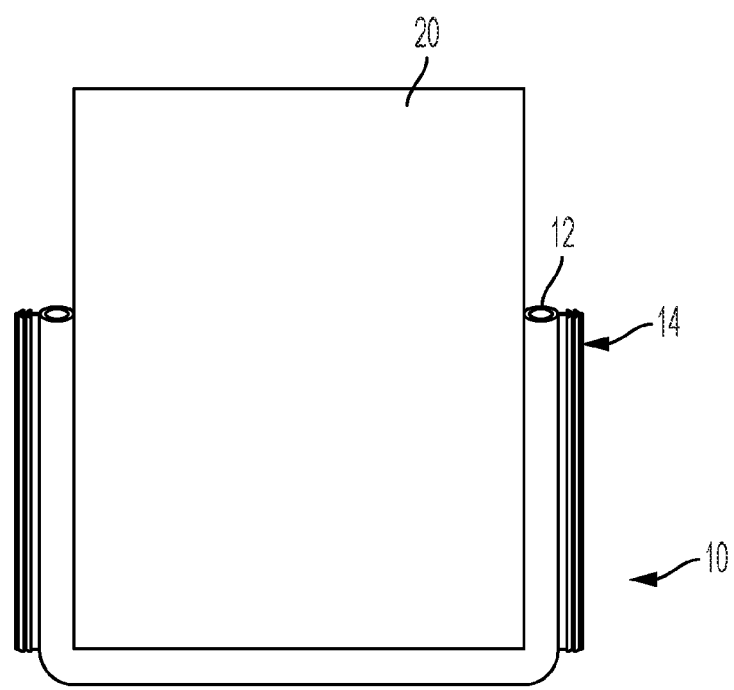
FIG. 2 is a perspective view of a weather seal attached to a door, in accordance with an embodiment.

Because of the microcellular foam composition of weather seal 10, it has the flexibility and resiliency to wrap around corners and maintain a pliable 90-degree angle, as shown in FIG. 2. In addition, this pliability permits a single weather strip 10 to be used on, for example, the bottom and side edges of a barrier between the indoors and outdoors, such as a door or window 20, as shown in FIG. 2, thus eliminating seams between strips of weather seal as would be necessary but for the pliability provided by seal 10.

In addition to the advantages of enhanced pliability, the microcellular foam composition lowers the cost and reduces the weight of the seal. Furthermore, the microcellular foam lowers the closing forces needed to be exerted by the user, thereby reducing pressure on the door/window hardware (closing force is no more than 5 lbs. per foot in most common designs); this is particularly important for installations that are focused on compliance with the Americans with Disabilities Act. Also, the compression set resistance is approximately 10% or lower.

The foaming agent used to form seal 10 is also capable of receiving a silicone slip agent 22 that will reduce the coefficient of friction by at least 20%. This will further enhance the seal's advantages beyond its low closing force and light weight. Coloring agents could also be added for aesthetics. The desired lower coefficient of friction can be achieved by adding the slip agent into the polymer mix or it can be achieved by selectively coextruding a thin layer of the slip material on the surface of the weatherseal in the area that will be in contact with the mating surface To manufacture seal 10, a co-extrusion of two materials, both of which are foamed, is employed. Barbs 18 are foamed which simplifies the tooling design, resulting in two extruders being needed. An extended mandrel is used to improve the melt strength of the material as the foaming occurs when the material exits the die face and hits atmospheric pressure. The extended mandrel provides enhanced strength until the material gets closer to the water-cooling tank.

Figure 4:
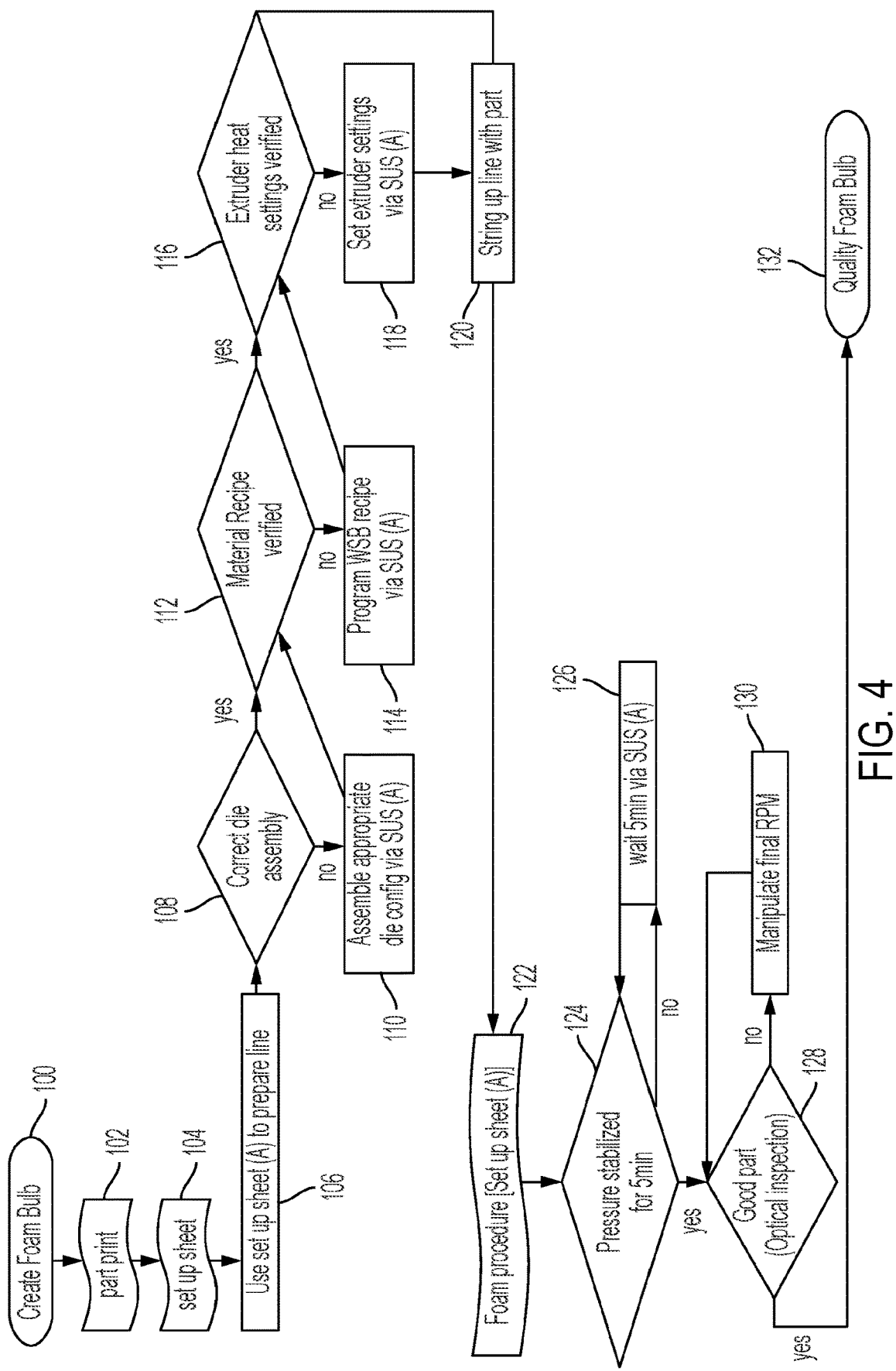
FIG. 4 is a flow chart illustrating a manufacturing process, in accordance with an embodiment.

With reference to FIG. 4, a flow chart that illustrates the manufacturing process employed is provided. For purposes of manufacturing a foam bulb 100, wherein the part will be printed 102, a set up sheet 104 is configured with the die tooling, main extruder heat settings, and material recipe listed (see FIG. 5 for a sample set up data sheet). This set up sheet 104 is used to prepare the manufacturing line, step 106. A microcontroller determines whether the line is set with the correct die assembly in step 108. If not, the set up sheet 104 is referenced in step 110 such that the correct die assembly is set. Once the correct die assembly is set in step 110 or confirmed in step 108, the microcontroller verifies whether the material recipe is correctly programmed in the line in step 112. If not, the program recipe is referenced in step 114 from set up sheet 104. Once the recipe is verified, the microcontroller verifies whether the extruder heat setting are correct in step 116. If not, the heat settings of the extruder are referenced from set up sheet 104 and corrected in step 118. Once verified, the manufacturing line begins to string up the foam bulb in step 120, and in step 122 the microcontroller instructs the foaming procedure to execute pursuant to the set up sheet 104. The microcontroller then runs the line for 5 minutes in step 124 to allow the pressure of the material to stabilize. A counter 126 confirms when the 5 minute stabilization period has run. Once run and the manufacture of a foam bulb is executed the part is quality checked in step 128 via an optical inspection device, and if it does not pass the quality test, the speed of the extruders is manipulated in step 130 until the quality is acceptable. Once the quality is acceptable, the quality foam bulb is taken off the assembly line in step 132 (and reeled or cut to length and packaged).

Figure 6:
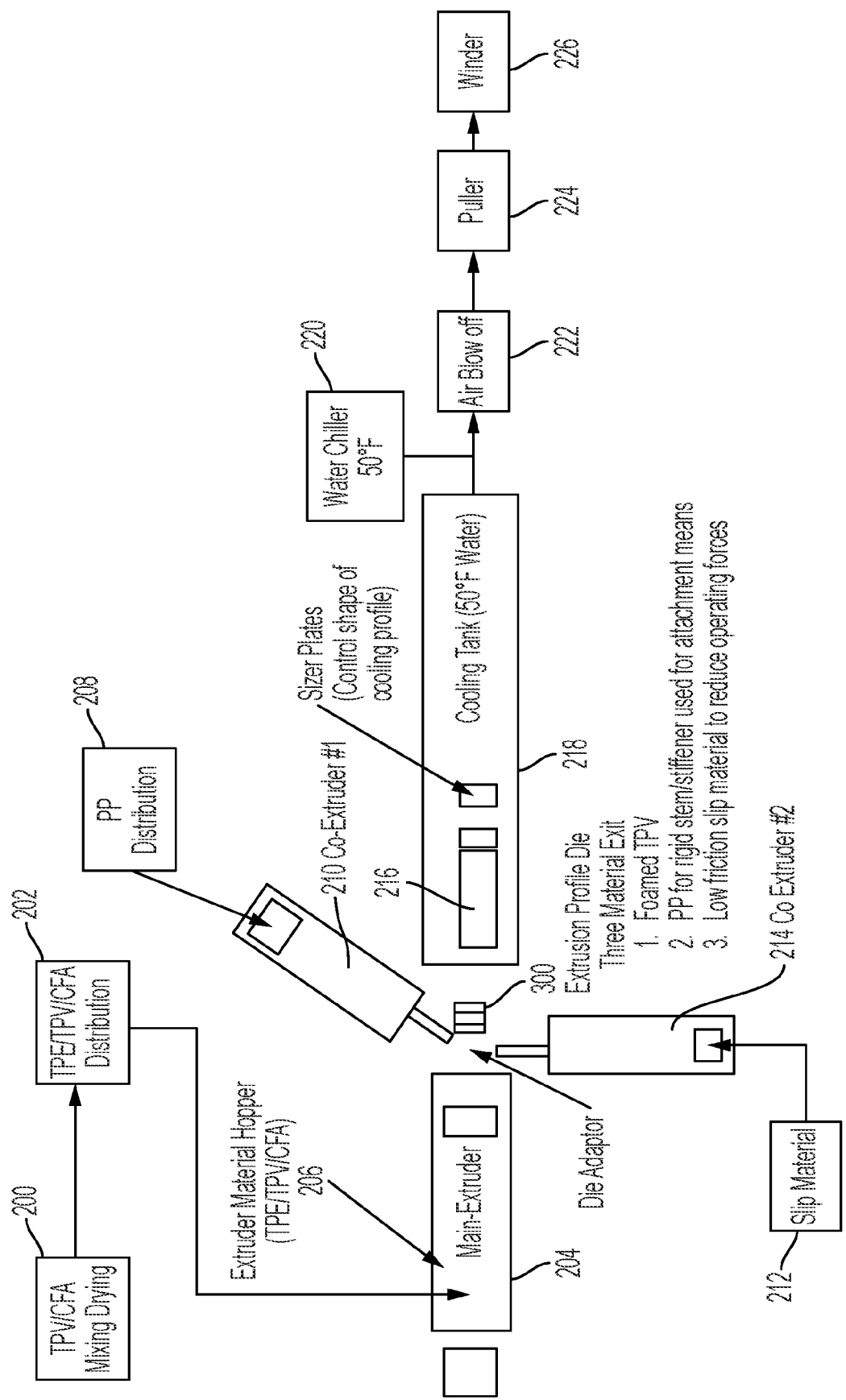
FIG. 6 is a box diagram illustrating a manufacturing line, in accordance with an embodiment.

With reference to FIG. 6, a block diagram of the manufacturing line is provided. The line includes a material TPV/CFA, for example) mixing and drying vessel 200 which conveys the mixed/dried material to a material distribution vessel 202 that will distribute the materials to a main extruder 204 via a hopper 206. Polypropylene distribution vessel 208 is set up in parallel with vessel 202, and distributes the PP material to a first co-extruder 210. A slip material vessel 212 also is st up in parallel and distributes slip material to a second co-extruder 214. Main extruder 204, first extruder 210 and second co-extruder 214 are positioned to extrude the materials into a three piece extrusion profile die 300 that includes three material exits (one for the foamed PV material, one for the PP material, and one for the low friction slip material). Once exiting the die 300, the extruded weather-strip then enters a sizer plate 216 that is at the leading end of a cooling water tank 218 that is filled with 50 degree F. water. A water chiller 220 maintains the water at the chilled temperature. As the weather-strips is pulled through the water tank 218 it then passes a blower 222 that blows off excess water, before passing through the puller/cutter 224 that pulls the weather-strip though the entire line and cuts it into desired lengths or the product passes through cutter device to be wound onto a reel by a winder 226.

Figure 7:
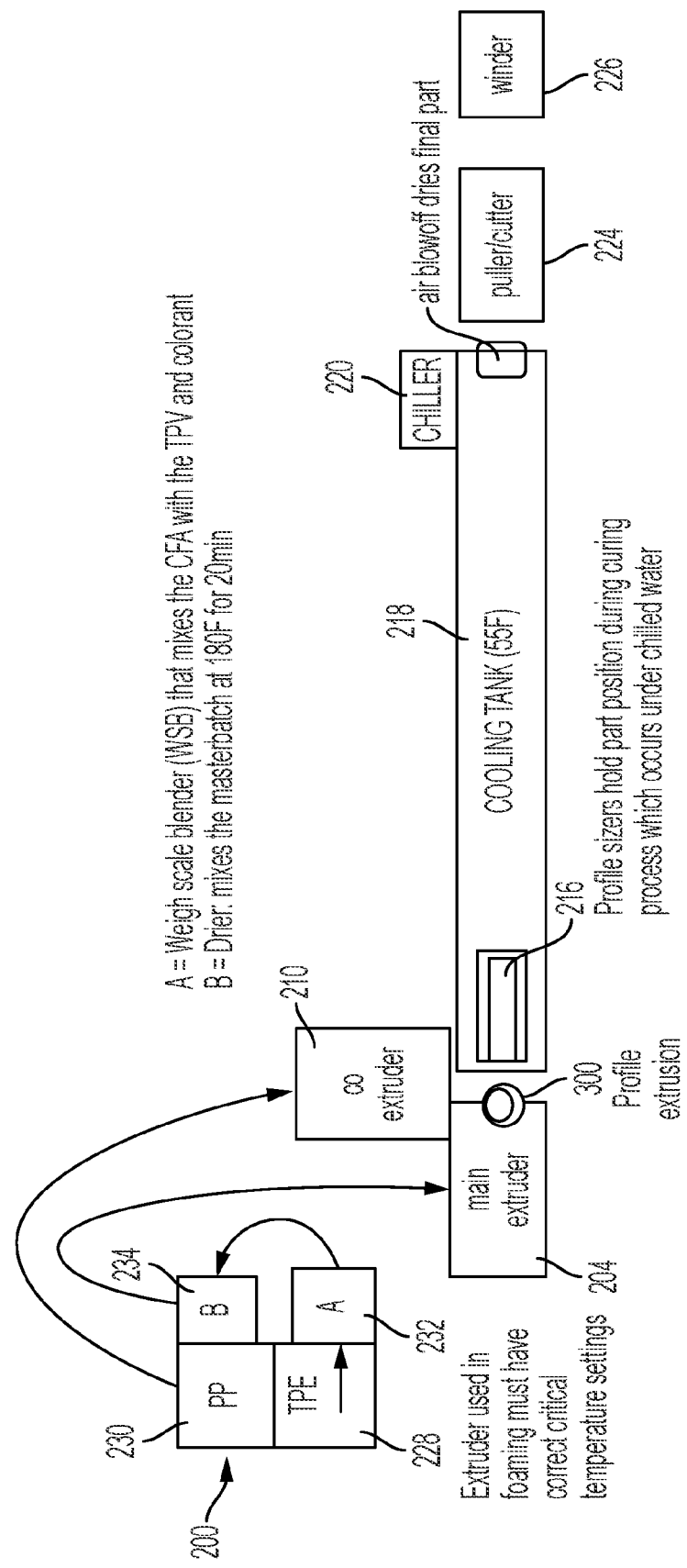
FIG. 7 is a detailed box diagram illustrating a manufacturing line, in accordance with an embodiment.

FIG. 7 shows a more detailed view of some of the equipment. Mixing and drying vessel 200 includes a TPE holding cell 228 and a PP holding cell 230. The TPE material is delivered to a weigh scale blender 232 where the CFA and TPV materials are mixed and then passed into a drier 234.

Figure 8:
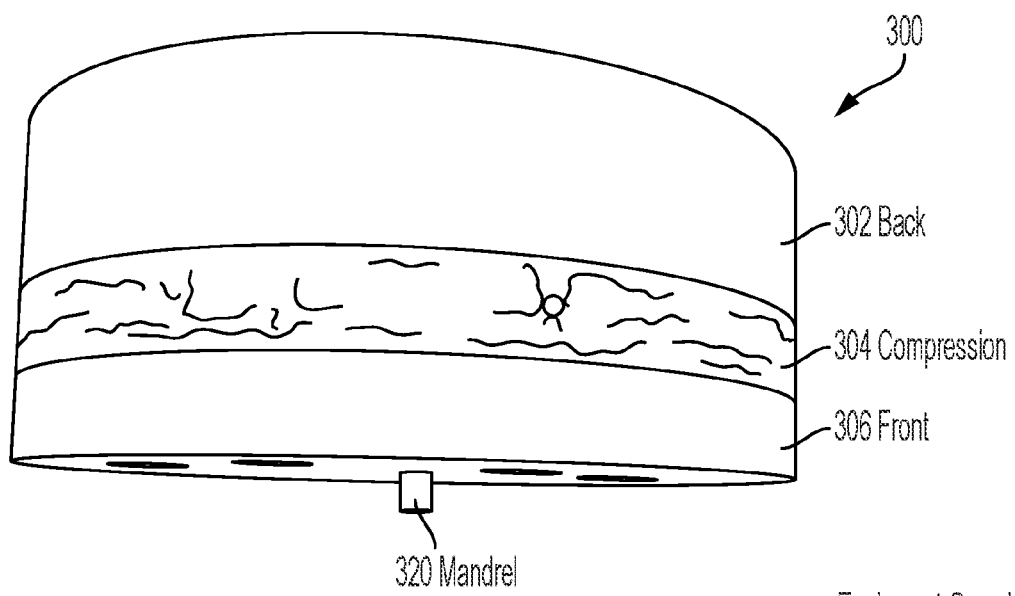
FIG. 8 is a side elevation view of a die, in accordance with an embodiment.

FIG. 8 show more details of die 300 used to form the weather-strip. Die 300 comprises three plates: a back plate 302, a compression plate 304, and a front plate 306. Material enters back plate 302 from the extruders 204, 210, and 214 and exits die 300 through front plate 306. The back plate 302 includes the main extruder input 308 where the micro-cellular foam material is introduced into die 300. A co-extrusion input is provided for introduction of the PP material into die 300 (and a separate input can be provided for slip agent entrance). A splitter separates the main extruder materials into two sections—one for the bulb and one for the barbs. Back plate's back face matches the face of the extruder's adaptor die which is the first face of the profile die assembly that material is introduced.

A mandrel 320 is inserted into compression plate supplies air into the die 300 which is critical in tolerancing and processing. The mandrel 320 extends about a half an inch from the front face of the die 300. This extra length aids in improving melt strength upon exiting the die prior to cooling in the water tank.

After exiting compression plate 304, the material hits the front face of the front plate 306. Upon exiting the front face of the front plate the various separate channels derived from the two materials merging together connect as one in the final opening.

Figure 9:
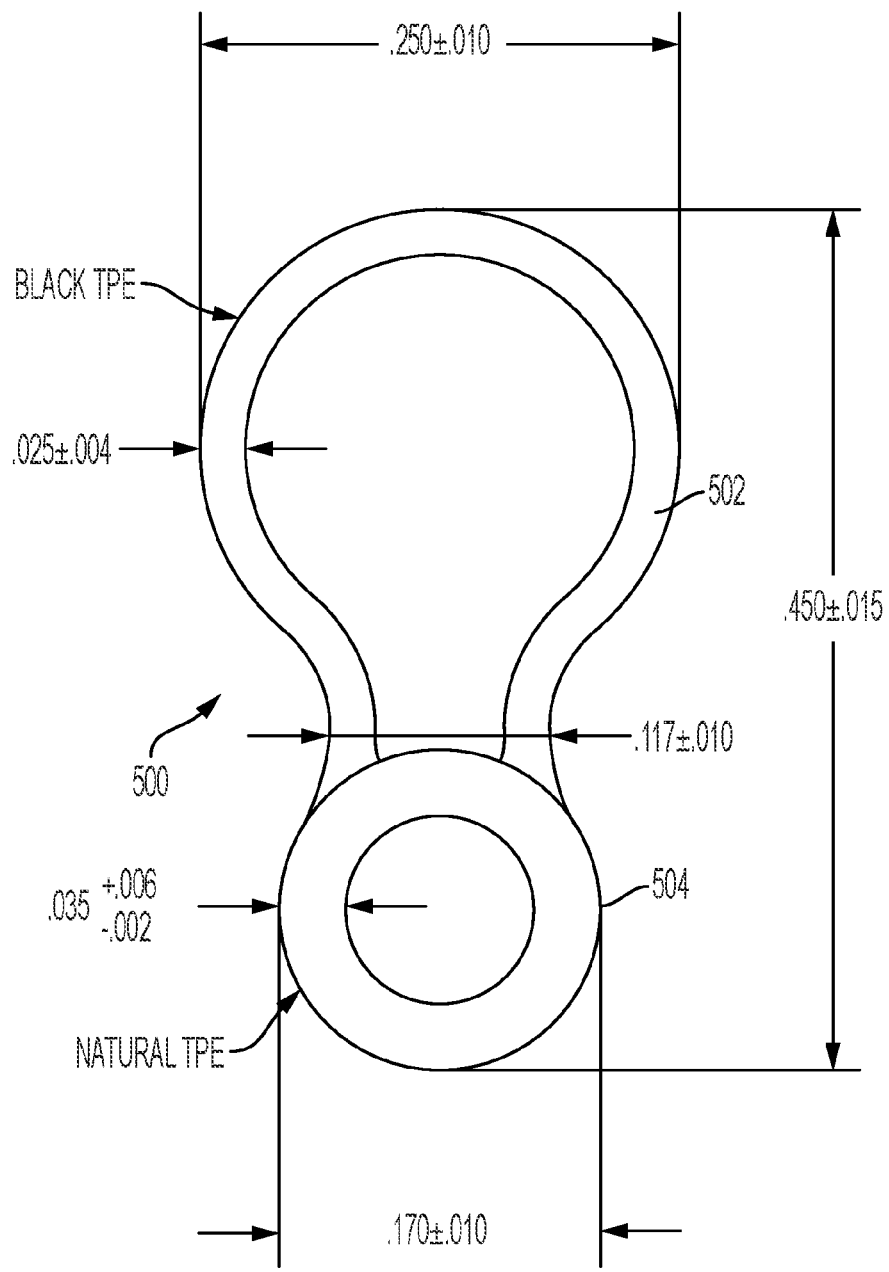
FIG. 9 is a cross-sectional view of a weather seal, in accordance with an embodiment.
Figure 11:
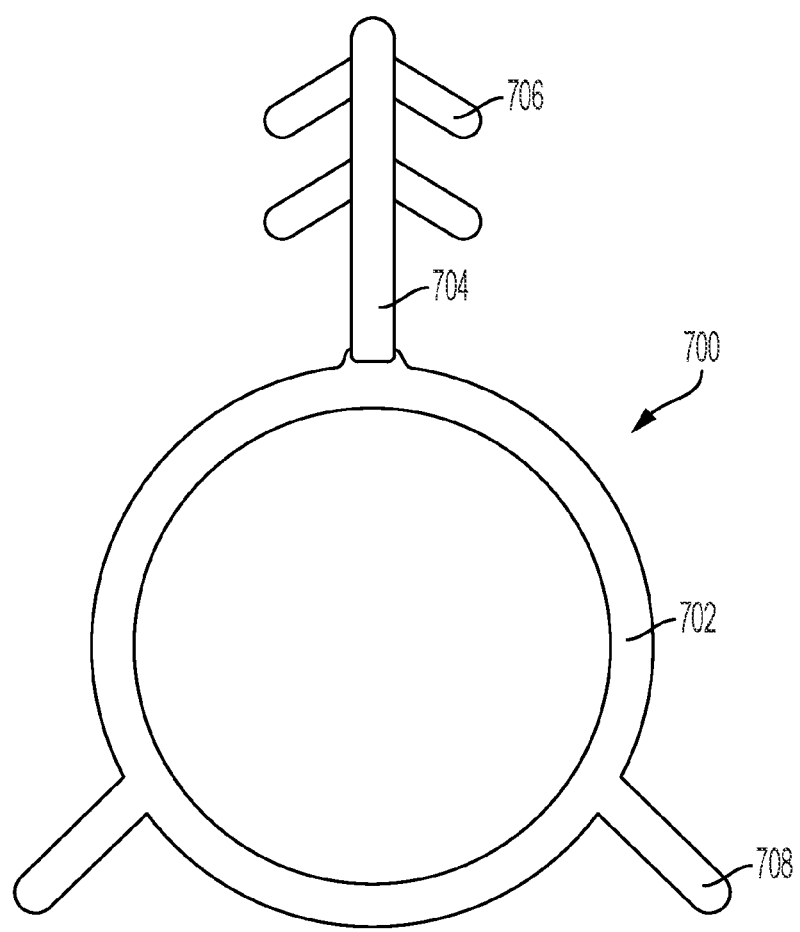
FIG. 11 is a cross-sectional view of a weather seal, in accordance with an embodiment.

In addition to a barbed weather-strip, the same manufacturing process can be employed with different dies to form different profile weather-strips that are also composed of the foam material. For example, a high pocket profile weather-strips 500, see FIG. 9, having a bulbous portion 502 and a cylindrical/bulb shaped portion 504 of smaller diameter than the bulbous portion. Or a weather-strip 600, see FIG. 10, having a tear drop shaped (triangularly slanted) upper bulb portion 602 of 25 durometer and a cylindrical lower portion 604 of 30 durometer, wherein the diameter of the lower portion is smaller in dimension that the length of the bulb portion. As another option, see FIG. 11, a weather seal 700 having the micro-cellular foam bulb 702, polypropylene spine 704 and micro-cellular foam barbs 706 just like with weather seal 10, but further including at least one sealing flap 708 of about the same dimensions as the barbs 706 that extend diagonally upward from the top of bulb 702. Sealing flaps 708 extend the sealing area when compressed against mating surface. In addition, multi-hollow bulb profiles, such as those taught in the Applicant's prior pending U.S. application, published as US 2012/0260579, and PCT Patent Application, No. US 2012/033773 (PCT Publication No. 2012/142574) all of which are hereby incorporated by reference, could be produced using the micro-cellular foam manufacturing process. The micro-cellular foam composition of the sealing members in the various weather-strips is an aspect that provides the stated utility and improvements over the art, and each can be manufactured on a line as described herein.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for manufacturing a multi-cellular foam weather seal for use on a weather permeable barrier separating the indoor from the outdoor and having an elongated, compressible micro-cellular foam bulb adapted for connection to the barrier and an elongated, compressible micro-cellular foam element attached to and extending along the length of the foam bulb, wherein the foam element is spaced from the barrier, the method comprising the steps of:
   a. delivering the multi-cellular foam material from a first storage cell to a weigh scale blender and then to a drier;
   b. delivering the multi-cellular foam material from the drier to a main extruder;

c. delivering a polypropylene material from a second storage cell to a first co-extruder;

d. delivering a slip material from a third storage cell to a second co-extruder;

e. pulling the multi-cellular foam material, the polypropylene material, and the slip material from through the main extruder, first co-extruder, and the second co-extruder respectively, and into a die;

f. forming the weather seal in the die;

g. pulling the weather seal from the die and into a sizer plate;

h. pulling the weather seal from the sizer plate into a cooling tank;

i. blowing off excess water from the weather seal after it passes out of the cooling tank; and j. winding the weather seal on a reel.

2. The method according to claim 1, comprising the further step of providing a second co-extruder and delivering a slip agent material into the second co-extruder.

3. The method according to claim 1, comprising the further step of injecting the slip agent material from the second c-extruder into the die, whereby the slip agent material will coat the weather strip as it comes out of the die.

4. The method according to claim 1, comprising the further step of optically inspecting the weather strip as it comes out of the cooling tank.

5. The method according to claim 1, comprising the further step of maintaining the water in the cooling tank at a predetermined temperature.

6. A method for manufacturing a multi-cellular foam weather seal for use on a weather permeable barrier separating the indoor from the outdoor and having an elongated, compressible micro-cellular foam bulb adapted for connection to the barrier and an elongated, compressible micro-cellular foam element attached to and extending along the length of the foam bulb, wherein the foam element is spaced from the barrier, the method comprising the steps of:

a. preparing a set-up sheet configured with the die tooling parameters, main extruder heat settings, and material recipe;

b. verifying the correct die assembly is in place;

c. verifying the correct material recipe is being used;

d. verifying the extruder heat settings are correct;

e. stringing up a weather strip by pulling one through an assembly line to a puller;

f. providing a micro-cellular foaming agent procedure to be followed during manufacture of the weather seal;

g. stabilizing the pressure in the extruders for a predetermined period of time;

h. inspecting the weather strip for quality as it comes off the manufacturing line; and i. if the weather seal does not pass the quality inspection, adjusting the speed with which the weather strip is pulled through the manufacturing line.

\* \* \* \* \*